United States Patent
McDougall et al.

(10) Patent No.: US 8,949,295 B2
(45) Date of Patent: Feb. 3, 2015

(54) COOPERATIVE MEMORY RESOURCE MANAGEMENT VIA APPLICATION-LEVEL BALLOON

(75) Inventors: Richard McDougall, Menlo Park, CA (US); Wei Huang, Sunnyvale, CA (US); Ben Corrie, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1097 days.

(21) Appl. No.: 12/826,389

(22) Filed: Jun. 29, 2010

(65) Prior Publication Data

US 2011/0320682 A1    Dec. 29, 2011

(51) Int. Cl.
| | | |
|---|---|---|
| G06F 7/00 | (2006.01) | |
| G06F 17/30 | (2006.01) | |
| G06F 9/455 | (2006.01) | |
| G06F 12/02 | (2006.01) | |
| G06F 12/10 | (2006.01) | |

(52) U.S. Cl.
CPC .......... *G06F 9/45504* (2013.01); *G06F 12/023* (2013.01); *G06F 9/45558* (2013.01); *G06F 12/10* (2013.01); *G06F 2009/45583* (2013.01)
USPC ................. 707/813; 711/9; 719/312

(58) Field of Classification Search
None
See application file for complete search history.

(56) References Cited

U.S. PATENT DOCUMENTS

| | | | |
|---|---|---|---|
| 5,493,663 A | 2/1996 | Parikh | |
| 5,606,685 A | 2/1997 | Frandeen | |
| 6,202,127 B1 | 3/2001 | Dean et al. | |
| 6,496,912 B1 | 12/2002 | Fields et al. | |
| 6,789,156 B1 | 9/2004 | Waldspurger | |
| 7,412,492 B1 | 8/2008 | Waldspurger | |
| 7,421,533 B2 | 9/2008 | Zimmer et al. | |
| 7,433,951 B1 | 10/2008 | Waldspurger | |
| 7,472,252 B2 | 12/2008 | Ben-Zvi | |
| 7,500,048 B1 | 3/2009 | Venkitachalam et al. | |
| 7,640,543 B2 | 12/2009 | Vij et al. | |
| 7,702,843 B1 * | 4/2010 | Chen et al. ........................ | 711/6 |
| 7,716,446 B1 | 5/2010 | Chen et al. | |
| 7,797,699 B2 | 9/2010 | Kagi et al. | |
| 7,870,153 B2 | 1/2011 | Croft et al. | |
| 7,886,126 B2 | 2/2011 | Bennett et al. | |
| 8,095,931 B1 | 1/2012 | Chen et al. | |
| 8,156,492 B2 | 4/2012 | Dahlstedt | |

(Continued)

OTHER PUBLICATIONS

Heo et al., "Memory overbooking and dynamic control of Xen virtual machines in consolidated environments", IFIP/IEEE International Symposium on Integrated Network Management, pp. 630-637, 2009, IEEE.*

(Continued)

*Primary Examiner* — Michael Hicks (57) ABSTRACT

Methods, systems, and computer programs for managing memory in a host where virtual machines (VMs) execute are presented. In one embodiment, a method includes an operation for determining which amount of heap memory has been reserved in a Java virtual machine (JVM) that is in excess of the heap memory needed by the JVM. If there is excess heap memory, a Java balloon agent reserves a Java object in the heap memory. Typically, the Java object will be the size of one or more memory pages in the host. Further, the Java balloon agent loads the Java object with a certain value, for example, by zeroing out the page of memory. When a virtual machine monitor (VMM) in the host detects that a machine physical memory page associated with the Java object has the first value, then the VMM frees the machine physical memory page to make the memory available to other VMs or to other processes executing in the host.

22 Claims, 10 Drawing Sheets

(56) References Cited

U.S. PATENT DOCUMENTS

| | | | |
|---|---|---|---|
| 8,359,451 | B2 | 1/2013 | Chen et al. |
| 8,543,790 | B2 | 9/2013 | Chen et al. |
| 8,583,875 | B1 | 11/2013 | Garthwaite et al. |
| 8,788,739 | B2 * | 7/2014 | Chang et al. ................ 711/6 |
| 2001/0044856 | A1 | 11/2001 | Agesen et al. |
| 2002/0019716 | A1 | 2/2002 | Agesen et al. |
| 2003/0212719 | A1 | 11/2003 | Yasuda et al. |
| 2005/0232192 | A1 | 10/2005 | Rawson, III |
| 2005/0262505 | A1 | 11/2005 | Esfahany et al. |
| 2006/0004944 | A1 | 1/2006 | Vij et al. |
| 2006/0064697 | A1 | 3/2006 | Kagi et al. |
| 2006/0161719 | A1 | 7/2006 | Bennett et al. |
| 2007/0038837 | A1 | 2/2007 | Ben-Zvi |
| 2007/0136402 | A1 | 6/2007 | Grose et al. |
| 2007/0192329 | A1 | 8/2007 | Croft et al. |
| 2009/0070776 | A1 * | 3/2009 | Dahlstedt ................ 719/312 |
| 2010/0211754 | A1 | 8/2010 | Crosby et al. |
| 2010/0241785 | A1 | 9/2010 | Chen et al. |
| 2011/0320682 | A1 | 12/2011 | McDougall et al. |
| 2012/0110577 | A1 | 5/2012 | Chen et al. |
| 2012/0185854 | A1 | 7/2012 | Dahlstedt |
| 2012/0233435 | A1 | 9/2012 | Ben-Yehuda et al. |
| 2013/0132957 | A1 | 5/2013 | Chen et al. |
| 2013/0218644 | A1 | 8/2013 | Kasravi et al. |
| 2013/0290382 | A1 | 10/2013 | Adachi et al. |
| 2013/0290596 | A1 * | 10/2013 | Corrie ................ 711/6 |

OTHER PUBLICATIONS

Gordon et al., "Ginko: Automated, Application-Driven Memory Overcommitment for Cloud Computing", ASPLOS RESoLVE—Workshop on Runtime Environments/Systems, Layering, and Virtualized Environments, 2011.*

Schwidefsky et al., "Collaborative Memory Managment in Hosted Linux Environments", Proceedings of the Linux Symposium, vol. 2, pp. 313-328, 2006.*

Tauber, "Automation and Optimization in IT-DB OracleVM virtualization systems", CERN openlab, Aug. 20, 2010.*

Patent Cooperation Treaty, "International Search Report," issued by the International Searching Authority in connection with PCT application No. PCT/US2011/042388, mailed Aug. 30, 2011 (3 pages).

Patent Cooperation Treaty, "Written Opinion of the International Searching Authority," issued by the International Searching Authority in connection with PCT/US2011/042388, Aug. 30, 2011 (4 pages).

C.A. Waldspurger, "Memory Resource Management in VMware ESX Server," Proceedings of the 5th Symposium on Operating Systems Design and Implementation (OSDI 2002), AMC Operating Systems Review, pp. 181-194, Dec. 2002.

Alexander Thomas Garthwaiteet al., "Efficient Readable Ballooning of Guest Memory by Backing Balloon Pages With a Shared Page." U.S. Appl. No. 12/835,303, filed Jul. 13, 2010.

Patent Cooperation Treaty, "International Search Report," issued in connection with International Patent Application No. PCT/US2011/042388, on Aug. 30, 2011 (2 pages).

Patent Cooperation Treaty, "Written Opinion of the International Search Authority," issued in connection with International Patent Application No. PCT/US2011/042388, on Aug. 30, 2011 (4 pages).

Patent Cooperation Treaty, "International Preliminary Report on Patentability," issued in connection with International Patent Application No. PCT/US2011/042388, on Jan. 8, 2013 (5 pages).

* cited by examiner

COOPERATIVE MEMORY RESOURCE MANAGEMENT VIA APPLICATION-LEVEL BALLOON

CROSS REFERENCE TO RELATED APPLICATIONS

This application is related to U.S. Pat. No. 7,716,446, filed Sep. 21, 2006, and entitled "SYSTEM AND METHOD FOR COOPERATIVE VIRTUAL MACHINE MEMORY SCHEDULING"; U.S. patent application Ser. No. 12/729,428, filed Mar. 23, 2010, and entitled "MANAGEMENT OF HOST PHYSICAL MEMORY ALLOCATION TO VIRTUAL MACHINES WITH A BALLOON APPLICATION"; and U.S. application Ser. No. 11/525,561, filed on Sep. 21, 2006, and entitled "DETERMINING MEMORY CONDITIONS IN A VIRTUAL MACHINE", which are incorporated herein by reference.

FIELD OF THE INVENTION

The present invention relates to methods for managing memory in a host, and more particularly to, methods, systems and computer programs for cooperative memory management via application-level balloons.

DESCRIPTION OF THE RELATED ART

Virtual computing environments allow multiple virtual machine (VM) guests to be run on a single physical platform and to share physical resources. Some virtual computing environments allow configuring the VMs in a way where the total amount of memory designated for used by the VMs is bigger than the actual amount of memory available on the host. This is referred to as memory over-commitment, and it allows packing more VMs onto a single host.

Memory over-commitment is one of the key benefits of virtualization. In some implementations, if a VM is not using all of its allocated physical memory, the VM is charged an idle tax so some physical memory is taken away from the VM and made available to others VMs or other processes in the host.

To achieve over-commitment, the virtual infrastructure gives a VM less memory than what the guest Operating System (OS) in the VM believes it has. This can be done by using what is called a balloon application. A balloon is a resource reservation application that runs as a guest application in the VM and that requests guest virtual memory from the guest operating system. By reserving guest virtual memory the balloon application assists with the reclamation of physical memory. In some implementations, a balloon driver is installed in the guest OS to facilitate communications with the virtual infrastructure.

Another mechanism for memory management is called swapping, where the virtual infrastructure transparently unmaps (i.e., takes away) machine memory pages from the guest OS, swaps the content to disk, and swaps the pages back to physical memory if the guest OS accesses these pages. Both ballooning and swap may impact the performance of applications inside the guest, since there is less machine memory to use. However, as long as an application's active working set fits into the VM's memory share, the application will not suffer significant performance loss.

Unfortunately, there are applications that do not work well with memory over-commitment. Java Virtual Machine (JVM) is one of the most widely used applications in this category. JVMs have their own memory management mechanisms. Allocated Java objects sit in a JVM heap until JVM runs out of heap space, and in this event, Garbage Collection (GC) sweeps the heap and recycles dead objects, which are the objects unreachable from the program. GC is notoriously bad for memory over-commitment, because the heap becomes cluttered and fragmented over time, which means that there is no way of knowing which memory pages can be used for memory management. Attempts to over-commit the memory may result in a lack of memory to back up the JVM heap, causing a significant performance hit.

Java is widely deployed in production environments, and there is an increasing demand to consolidate a large number of VMs running Java applications, such as Apache Tomcat Servers, on to a physical server. As these applications are typically lightly loaded, the consolidation ratio can be very high, leaving a small amount of physical memory for each VM.

Some commercial JVM implementations shrink the heap size when the application does not demand a high amount of memory. However, their mechanisms are not collaborative. The system has to wait for JVM to voluntarily shrink its heap instead of having JVM reducing the heap upon request, which does not perform well when using the balloon mechanism.

It is in this context that embodiments of the invention arise.

SUMMARY

Embodiments of the present invention provide methods, systems, and computer programs for managing memory in a host where virtual machines (VMs) execute. An application-level balloon, also referred to herein as a Java balloon, is deployed inside the Java Virtual Machine (JVM). When the VM kernel needs to take memory away from the VM, the Java balloon expands with the effect of making the JVM heap smaller at runtime. To avoid Out-Of-Memory (OOM) errors, the Java balloon shrinks by returning memory back to the JVM heap when the Java application is under memory pressure.

It should be appreciated that the present invention can be implemented in numerous ways, such as a process, an apparatus, a system, a device or a method on a computer readable medium. Several inventive embodiments of the present invention are described below.

In one embodiment, a method for managing memory in a host where VMs execute is provided. The method includes an operation for determining which amount of heap memory has been reserved in a JVM that is in excess of the heap memory needed by the JVM. If there is excess heap memory, a Java balloon agent reserves a Java object in the heap memory. Typically, the Java object will be the size of one or more memory pages in the host. Further, the Java balloon agent loads the Java object with a certain value, for example, by zeroing out the Java object. When a virtual machine monitor (VMM) in the host detects that a machine physical memory page associated with the Java object has the first value, then the VMM frees the machine physical memory page to make the memory available to other VMs or to other processes executing in the host. In another embodiment, a computer program performs the method operations.

In another embodiment, a method, for managing memory in a host where VMs execute, includes an operation for determining an amount of heap memory that has been reserved in a JVM and that is in excess of the heap memory needed by the JVM. A Java balloon agent reserves a Java object, with a size equal to the size of one or more pages of memory in the host, in the heap memory, and then obtains the virtual address of the Java object. Additionally, the method includes an operation for identifying the physical page number that corresponds to the virtual address. The physical page number is sent to a VMM, which frees the machine physical memory page associated with the physical page number.

In yet another embodiment, a system for managing memory in a host where VMs execute includes one or more VMs and a VMM. Each of the VMs includes a JVM and a Java balloon agent executing on the JVM. The Java balloon agent determines the amount of heap memory that has been reserved in the JVM and that is in excess of heap memory needed by the JVM. The Java balloon agent reserves in heap memory a Java object with a size equal to the size of one or more memory pages in the host. The Java balloon agent also loads the Java object with a first value, such as by zeroing out the page of memory. Further, the VMM frees the machine physical memory page associated with the Java object when the VMM detects that the machine physical memory page has the first value.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Methods, systems, and computer programs for managing memory in a host where virtual machines (VMs) execute are provided. In one embodiment, a method includes an operation for determining which amount of heap memory has been reserved in a Java Virtual Machine (JVM) that is in excess of the heap memory needed by the JVM. If there is excess heap memory, a Java balloon agent reserves a Java object in the heap memory. Typically, the Java object will be the size of one or more memory pages in the host. The Java balloon agent loads the Java object with a certain value, for example, by zeroing out the page of memory, and when a virtual machine monitor (VMM) in the host detects that a machine physical memory page associated with the Java object has the first value, then the VMM frees the machine physical memory page to make the memory available to other VMs or to other processes executing on the host.

It will be obvious, however, to one skilled in the art, that the present invention may be practiced without some or all of these specific details. In other instances, well known process operations have not been described in detail in order not to unnecessarily obscure the present invention.

In one embodiment, the VM memory is controlled using a Java agent, also referred to herein as a Java balloon or a Java balloon agent, a Java Native Interface (JNI) library, and a kernel driver. It should be noted that no modification to the guest OS or to the JVM is required. In operation, a kernel balloon driver receives a balloon target from the hypervisor, decides how much to shrink the Java heap, and sets a Java balloon target. The Java agent, which is attached to the running Java application via a management interface, periodically checks this Java balloon target to determine if more or less balloon memory is required. The agent expands the balloon by allocating Java array objects, also referred to herein as Java objects. Since the agent executes as a normal Java thread, the objects are allocated from the Java heap, effectively reducing the Java heap size. The agent then passes the Java object references to the JNI library, which finds the virtual address of the array objects and passes the addresses to the hypervisor. The hypervisor then reclaims the memory pages used by these objects, such as by sharing the reclaimed pages as Copy-On-Write (COW) pages.

COW is an optimization strategy where multiple callers ask for resources which are initially indistinguishable and where the multiple callers are given pointers to the same resource. This function can be maintained until a caller tries to modify its "copy" of the resource, at which time a true private copy is created to prevent the changes from becoming visible to other callers. All of this is transparent to all the callers. The primary advantage of COW is that if a caller never makes any modifications, no private copy needs to be created. COW finds its main use in virtual memory operating systems. When a process creates a copy of itself, the pages in memory that might be modified by either the process or its copy are marked copy-on-write. When one process modifies the memory, the operating system's kernel intercepts the operation and copies the memory so that changes in one process's memory are not visible to the other.

In one embodiment, the Java objects requested by the Java balloon are managed using soft references. This means that a special class of memory is requested that JVM can take away from the Java application. The application can check if the memory is taken away by JVM via predefined interfaces. Thus, when the Java heap is under memory pressure, these objects will be automatically freed by the Java garbage collector to avoid out-of-memory errors. If the process loses the memory, the process is notified when it tries to access the reclaimed memory.

Figure 1:
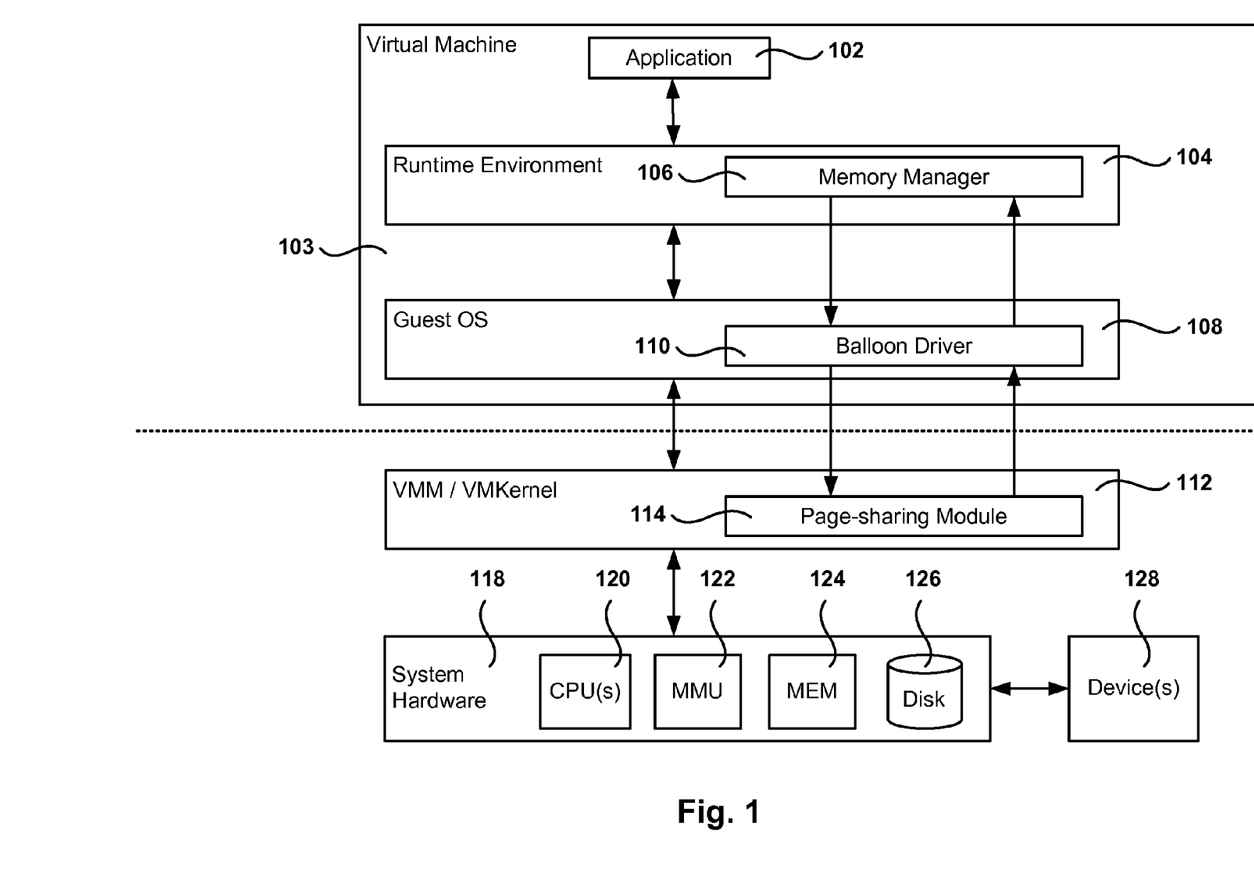
FIG. 1 illustrates the main components of a generalized hosted virtual computer system, according to one embodiment.

FIG. 1 illustrates the main components of a generalized hosted virtual computer system, according to one embodiment. The virtual computer system supports VM 103. As in conventional computer systems, both system hardware 118 and system software are included. The system hardware 118 includes one or more processors (CPUs) 120, which may be a single processor, or two or more cooperating processors in a known multiprocessor arrangement. The system hardware also includes system memory 124, one or more disks 126, and some form of Memory Management Unit (MMU) 122. The system memory is typically some form of high-speed RAM (random access memory), whereas the disk is typically a non-volatile, mass storage device. As is well understood in the field of computer engineering, the system hardware also includes, or is connected to, conventional registers, interrupt handling circuitry, a clock, etc., which, for the sake of simplicity, are not shown in the figure.

In many embodiments, system software typically is, or at least typically includes, an operating system (OS), which has drivers for controlling and communicating with various devices 128, and with the disk 126. In VM 103, the physical system components of a "real" computer are emulated in software, that is, they are virtualized. Thus, VM 103 will typically include virtualized guest OS 108 and virtualized system hardware (not shown), which in turn includes one or more virtual CPUs, virtual system memory, one or more virtual disks, one or more virtual devices, etc., all of which are implemented in software to emulate the corresponding components of an actual computer.

The guest OS 108 may, but need not, simply be a copy of a conventional, commodity OS. Balloon driver 110 is a driver installed in VM 103 and is used for communications with the hypervisor, enabling the implementation of balloon memory. In general, VMs are intended to be capable of running various applications. FIG. 1 illustrates a runtime environment 104 running on top of guest OS 108. Runtime environment 104 has its own memory manager 106 that requests memory from guest OS 108, which has its own methods for managing memory use over time. In one example, the runtime environment is a Java Virtual Machine (JVM) which enables a set of computer software programs and data structures to use a virtual machine model for the execution of other computer programs and scripts. It should be appreciated that embodiments of the invention use JVM as an example Runtime Environment, but the same principles can be applied to any application executing on top of the guest OS but has its own memory manager, such as databases, web servers, etc. The embodiments presented should therefore not be interpreted to be exclusive or limiting, but rather exemplary or illustrative.

Application 102 executes on the runtime environment, such as a Java program executing on a JVM. The interface between VM 103 and the underlying host hardware 118 is responsible for executing VM related instructions and for transferring data to and from the actual physical memory 124, the processor(s) 120, the disk(s) 126 and other device(s) 128. One such interface between the VM and the underlying host system is often referred to as a Virtual Machine Monitor (VMM) 112, also known as a virtual machine manager. Page sharing module 114 manages the sharing of pages of memory assigned to VMs, as described in more detail below.

Figure 2:
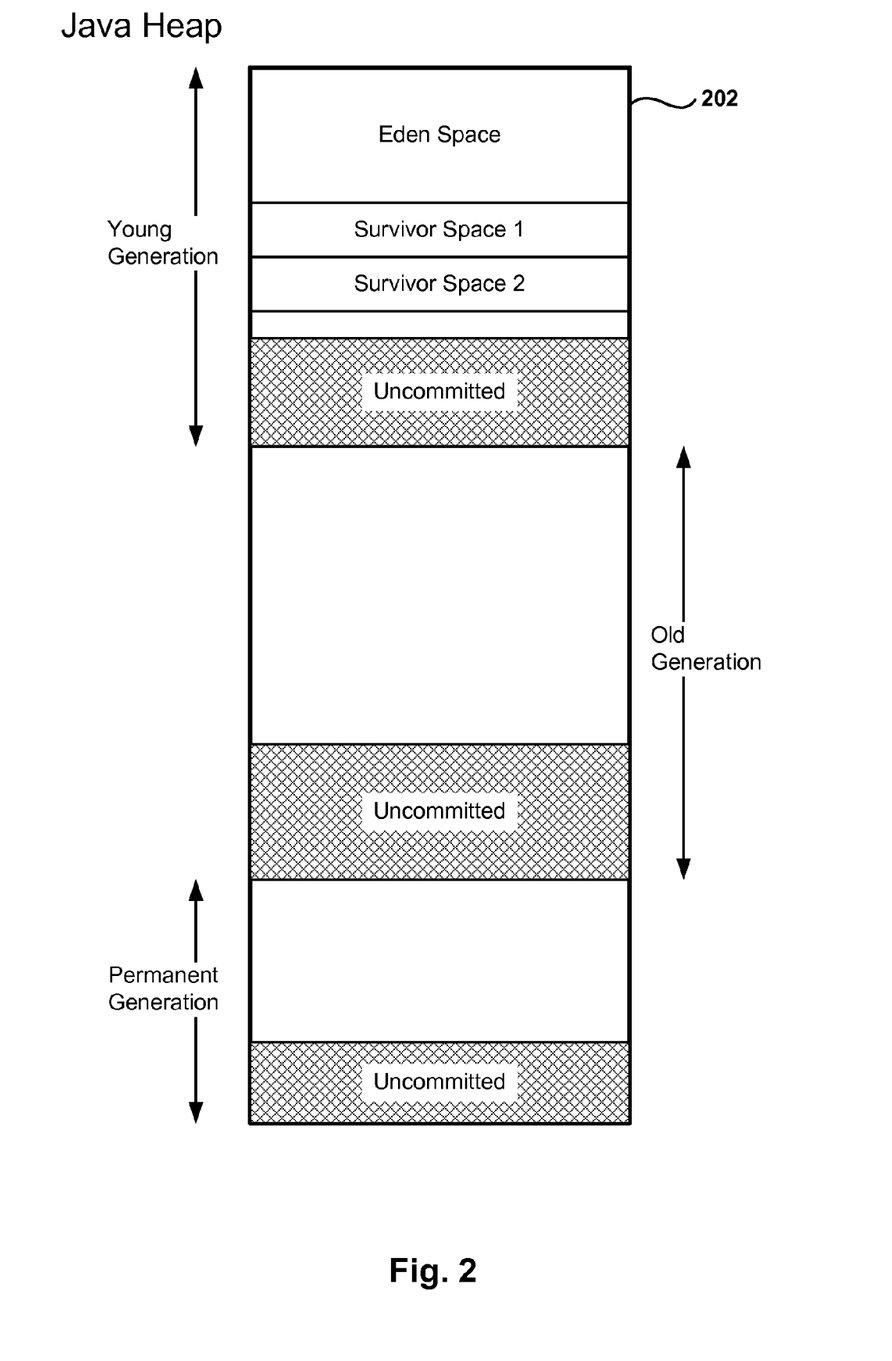
FIG. 2 depicts the layout of a Java heap.

FIG. 2 depicts the layout of a Java heap. In one embodiment, OpenJDK, an open source JVM implementation from Sun Microsystems, is used as the JVM implementation, but principles of the invention can also be used with other JVM implementations. FIG. 2 illustrates the layout of a running JVM's heap using the most widely used generational Garbage Collection (GC). The heap is divided into young, old, and permanent generations. The permanent generation holds static data, such as class descriptions, and has its own form of memory management. New objects are allocated into the eden space of the young generation. Once the eden space is exhausted, JVM starts a minor GC, where live objects (i.e., reachable) are copied into the survivor space. Further, there are two survivor spaces, which serve alternatively as the destination of live objects from the eden space or from the other survivor space.

Objects stay in young generation until they live long enough to be promoted into the old generation heap. Once the old generation heap runs out of space, a major GC happens and live objects are copied and compacted within the old generation heap to create free space. The old generation is typically larger than the young generation, so a major GC is usually costlier than a minor GC. In some GC algorithms, the major GC is performed using multiple working threads (parallel collector) to reduce pause time. The heap size may change over time because JVM may only commit a portion of the total heap space to be used by memory users. However, the maximum heap size is set statically when a JVM launches and does not change over time.

The example illustrated in FIG. 2 is just one example of the OpenJDK Java heap, and other JVM implementations may perform GC differently, but the principles of the invention can be applied in any JVM implementation where the heap size stays constant, independently on how GC is performed.

Figure 3:
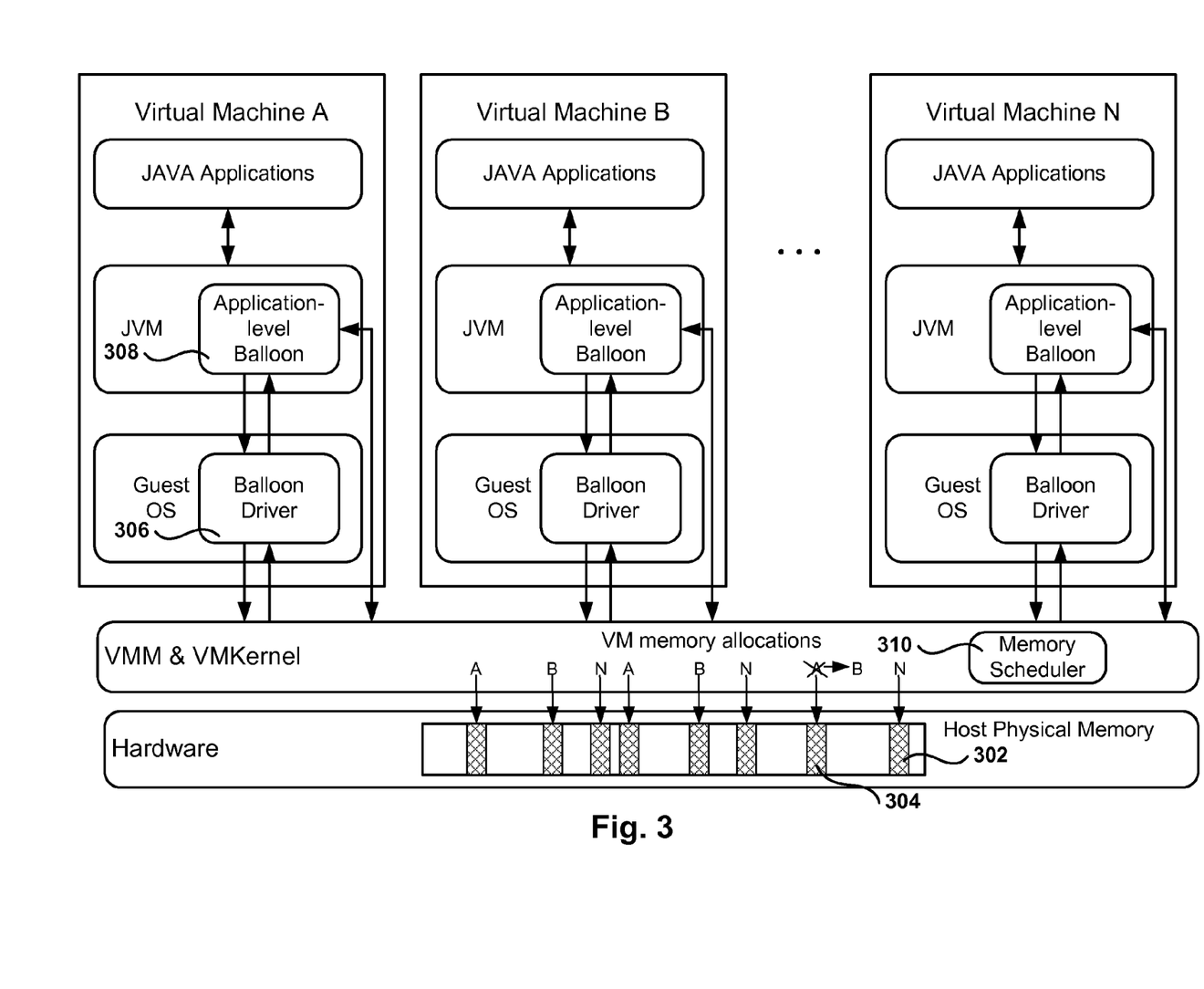
FIG. 3 illustrates the reallocation of physical memory from one VM to another VM, according to one embodiment.

FIG. 3 illustrates the reallocation of physical memory from one VM to another VM, according to one embodiment. Balloon driver 306 is responsive to commands sent from outside the virtual machine, such as from the VMM. The virtualization layer may use these commands to influence the balloon application's usage of guest virtual memory. For example, balloon driver 306 can receive commands indicating the size of the memory allocation requested from the guest operating system, and indicating the frequency with which to access that memory. Reserving guest virtual memory using a balloon driver provides increased control freedom compared to reserving guest physical memory directly. Such control freedom allows for better manipulation of memory conditions in the virtual machine. Periodically accessing guest virtual memory maintains allocations of guest physical memory, which assists the kernel with the reclamation of physical memory for the virtual machine.

The balloon operation is described in more detail in U.S. patent application Ser. No. 11/525,607, filed Sep. 21, 2006, and entitled "SYSTEM AND METHOD FOR COOPERATIVE VIRTUAL MACHINE MEMORY SCHEDULING"; and U.S. application Ser. No. 11/525,561, filed on Sep. 21, 2006, and entitled "DETERMINING MEMORY CONDITIONS IN A VIRTUAL MACHINE", which are incorporated here by reference. The balloon allows the kernel to reclaim memory from the guest indirectly, by adding an additional consumer of memory inside the guest operating system (the balloon). It should be noted that the balloon can be implemented as a balloon driver 306, as depicted in FIG. 3, or can be implemented as a separate application running on the VM.

As the balloon inflates, it takes memory from the guest OS environment and makes the memory available for the hypervisor. Conversely, if memory is available and needed by the guest OS, the balloon can shrink, allowing more memory to be allocated into the guest OS environment. The problem when using a JVM, is that for the balloon mechanism to work, the guest OS assumes a basic level of collaboration between the guest OS and the application. That is, if the application needs more memory, the application allocates memory from the guest OS and the guest OS recognizes if there is an ongoing need for that memory. If memory is no-longer needed by the application, the reduced need of memory is recognized by scanning the working set and by using the guest's OS mechanism to page-out unused memory. Alternatively, memory can be directly freed by the application.

FIG. 3 illustrates a scenario where VMs A, B, and N have been allocated some host physical memory, such as pages 302 and 304 belonging to VMs N and A, respectively. The VMKernel has determined that some physical memory can be taken away from VM A. The VMKernel has also decided to allocate additional memory to VM B. The VMKernel sends a request to balloon driver 306 in VM A to get a page of memory for "ballooning." Balloon driver 306 responds with page 304 and the VMKernel then "takes away" page 304 from VM A and proceeds to allocate it to VM B. It should be noted, that it is not necessary to have a designated recipient for the freed memory. The VMKernel may decide to place the freed memory in a pool of free resources that can be made available to any process that requests additional memory.

Figure 4:
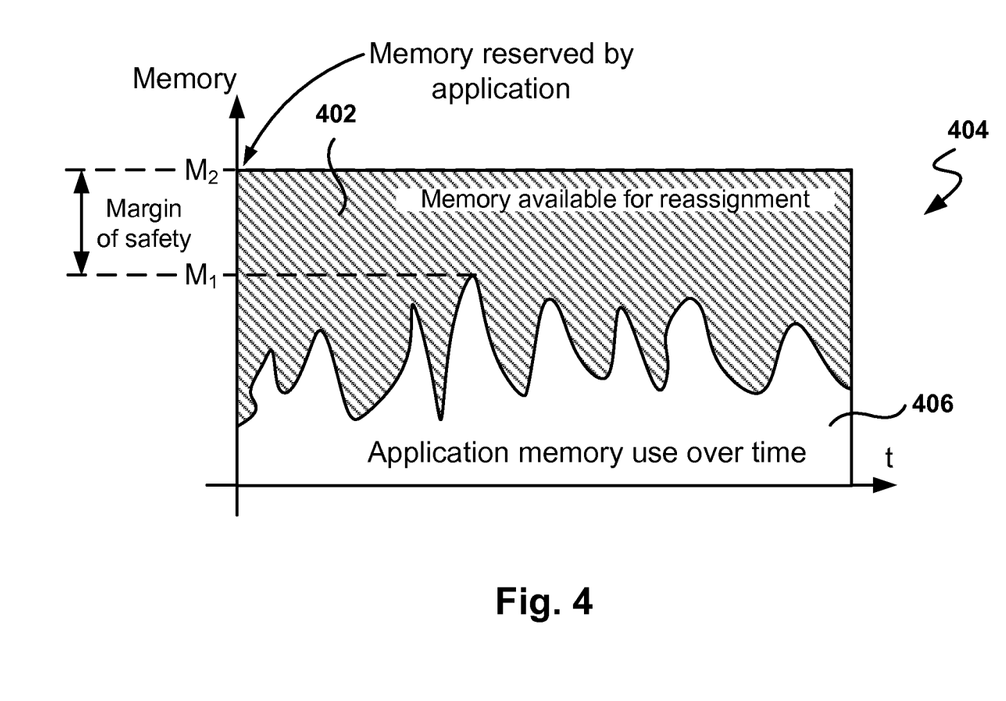
FIG. 4 includes a chart illustrating memory heap use, in accordance with one embodiment of the invention.

FIG. 4 includes chart 404 illustrating memory heap use, in accordance with one embodiment of the invention. As previously discussed, memory over-commitment is one of the key enablers for achieving a high server-consolidation ratio. However, JVMs are very unfriendly to over-commitment because of the way JVM manage the heap. In the scenario depicted in FIG. 4, a heap of size $M_2$ is created by the JVM. The Java heap size has to be large enough to avoid runtime out-of-memory errors during peak loads, even though most of the time the use of memory is below $M_2$. The mismatch between a large Java heap and a small amount of physical memory can cause great performance degradation.

Chart 404 shows memory used 406, which changes over time according to the applications' needs. In the Example of FIG. 4, the maximum use of memory is $M_1$ but the JVM has reserved more memory (up to $M_2$) to have a margin of safety. Determining how much memory a process is going to need is usually a guessing game, and that is why more memory than the memory required is reserved. Memory available for reassignment 402 is theoretically upper bound as the difference between $M_2$ and the amount of memory being used at a given time. However, using the balloon application to "free" all the available memory would cause a lot of additional processing by the memory management modules, as they try to constantly free and allocate memory as the memory use changes. As a result, the hypervisor uses a conservative approach by freeing pages of memory in incremental operations until the heap starts being under pressure for lack of memory. In one embodiment, the Java balloon obtains an amount of memory close to the difference between $M_2$ and $M_1$, although other policies are also possible.

Figure 5:
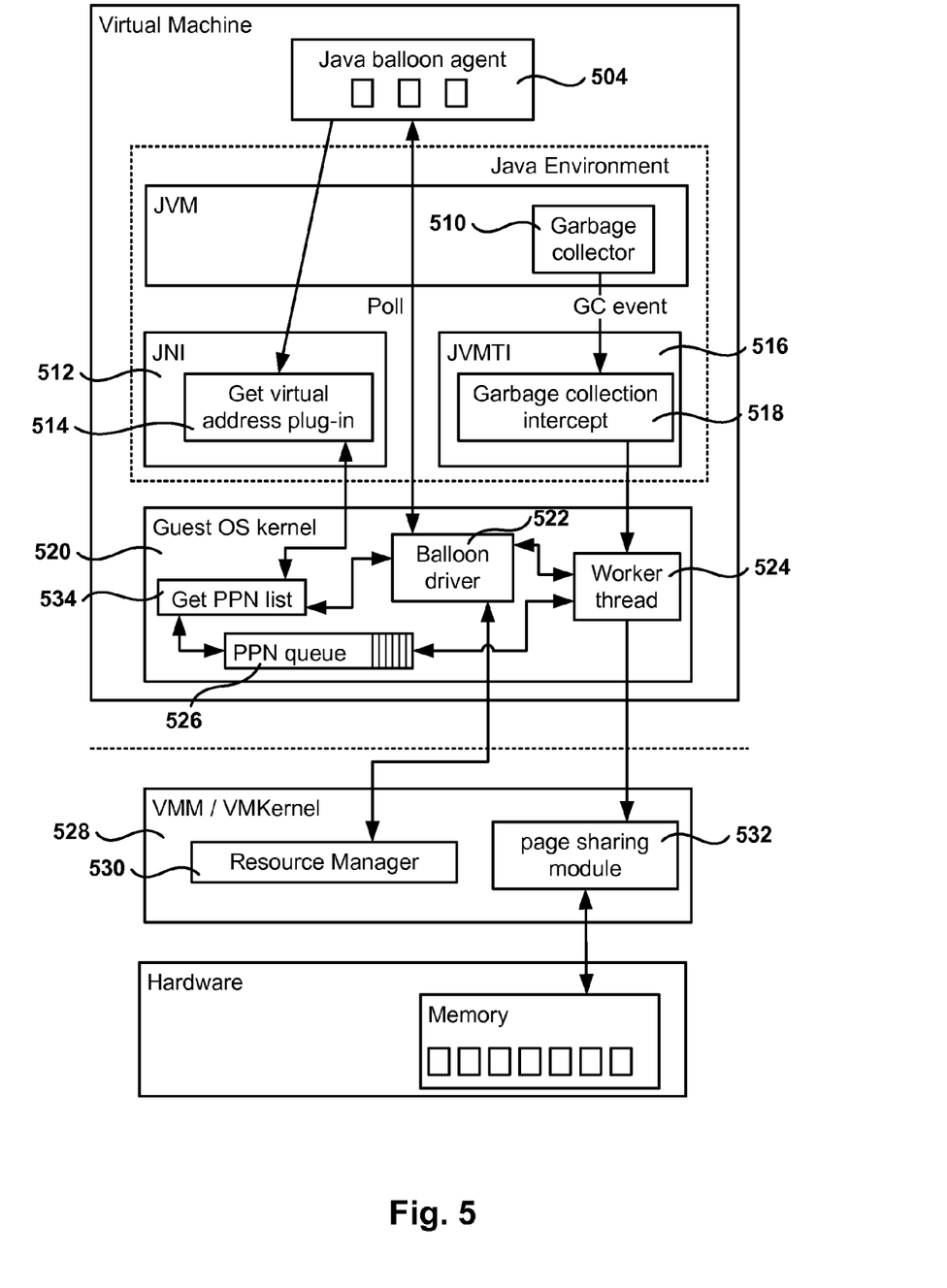
FIG. 5 is a simplified schematic diagram of a computer system for managing host memory using Java balloons, according to one embodiment.

FIG. 5 is a simplified schematic diagram of a computer system for managing host memory using Java balloons, according to one embodiment. One way to improve memory utilization is to ensure that no more memory than the memory that the heap needs is over-committed. However, this is not always feasible. Typically, users configure a large Java heap to avoid runtime OOM errors. Provisioning all this memory to the heap wastes memory resources, which is a huge obstacle for achieving a high consolidation ratio. Another solution is to shrink the Java heap size at runtime, but unfortunately, none of the commercial JVM implementations currently supports dynamic tuning of the heap size.

In one embodiment, an application-level Java balloon agent 504 is used for managing heap memory. Java balloon objects allocated inside the Java heap effectively reduce the heap space that can be used by the Java application. A smaller heap may cause GC to run more frequently, which decreases throughput. However, this use of Java balloon objects avoids more expensive disk swap activity. Further, if the deployment includes Java applications in which the heap has been purposefully over-provisioned, the impact of the balloon objects on overall performance will be minimal.

Java balloon 504 inflates and deflates by allocating and freeing large Java objects from the Java heap. Inside guest OS 520, balloon driver 522 communicates with resource manager 530 in VMKernel 528 and Java balloon 504. However, when balloon driver 522 receives instructions to inflate, balloon driver 522 requests Java balloon 504 to inflate, instead of asking for memory pages directly from guest OS 520. Java balloon 504 inflates by allocating new objects and then communicating the addresses of these pages to VMKernel 528.

Java agents are public management interfaces that allow a management thread to attach to a running Java application. Java agents ease Java application instrumentation, their interfaces and features make them suitable to implement application-level balloons. In one embodiment, when Java agent 504 starts operations, a Java thread is created. In one embodiment, this thread periodically polls for a new balloon target size from guest balloon driver 522. In another embodiment, the communication between balloon driver 522 and the Java balloon 504 thread is through standard posix system calls.

To inflate the balloon, the agent thread allocates new array objects (dubbed balloon objects) and adds them to a list. To deflate, the agent simply removes an array from the list and the space is re-claimed in the next GC. Object size is selected as 4 MB, so that the physical frame numbers can be encoded in one page, but other sizes are also possible. In general, the size selected will be at least the size of one page of memory in the host, and it will typically be the size of multiple pages of memory, although any size can be used. The use of large objects reduces the number of objects the agent needs to handle for meeting a large balloon target. Once the Java balloon agent thread allocates a new balloon object, the Java balloon agent needs to balloon the pages used by this object, as a traditional balloon driver does. There are several embodiments for implementing runtime environment ballooning, which are discussed below.

In one embodiment, the information about pages of an object allocated by the Java agent is communicated to the VMM using existing backdoor calls between VMM 528 and balloon driver 522. In regular application ballooning, when a balloon driver expands, it requests a page from the OS and passes the Physical Page Number (PPN) of this page to VMM through a backdoor call. To use the same backdoor calls, the balloon objects need to be translated into a set of PPNs. This is accomplished using JNI library 512 and a modified balloon driver 522.

JNI is a programming framework that allows Java code running in a JVM to call and to be called by native applications (programs specific to a hardware and operating system platform) and libraries written in other languages, such as C, C++ and assembly. As shown in FIG. 5, when Java balloon agent 504 allocates a balloon object, it calls into the JNI library 512 to get the virtual address 514 of this balloon object via GetPrimitiveArrayCritical. This is a C function and it is used by the Java balloon because there is no utility in Java to obtain the address of Java objects.

The virtual address is then passed 534 to the kernel balloon driver 522, which translates the virtual address into PPNs and also pins the PPNs in guest memory (e.g., using get_user_pages in Linux). The PPNs are enqueued in PPN queue 526 and a separate worker thread 524 passes the PPNs to page sharing module 532 in VMM 528 via backdoors. Using a separate thread allows to return from guest OS kernel sooner, which is important because, while the thread is in the VMKernel, the JNI library disables GC to lock objects in Java heap in order to avoid race conditions.

It should be noted that if the JVM does not support pinning (locking objects in the Java heap so their addresses do not change), the get virtual address call 514 may return a pointer to a copy of the array object, instead of returning a direct pointer to the array. In some embodiments, pinning is helpful for the call to properly return the virtual address of the Java object.

Java objects may be relocated during GC. Once a balloon object is moved because of GC, the balloon object is no longer at the virtual address provided to VMM 528. To avoid this situation, worker thread 524 in VMkernel 528 is notified before each GC to discard any unfinished work in queue 526. Otherwise, worker thread 524 may balloon out the pages of other Java objects. In addition, the balloon objects need to be re-checked after a GC to determine if they have been relocated, and if so, redoing the page sharing process. Garbage collector 510 generates a GC event before each GC, which is received by garbage collection intercept 518 in Java Virtual Machine Tool Interface (JVMTI) 516.

JVMTI is an interface that allows a program to inspect the state, and to control the execution of, applications running in the JVM. JVMTI is designed to provide an Application Programming Interface (API) for the development of tools that need access to the state of the JVM. Examples for such tools are debuggers or profilers. The JVMTI is a native interface of the JVM. A library, written in C or C++, is loaded during the initialization of the JVM. The library has access to the JVM state by calling JVMTI and JNI functions and can register to receive JVMTI events using event handler functions that are called by the JVM when such an event occurs. Upon receiving the GC event, garbage collection intercept 518 notifies worker thread 524, which clears up queue 526 in order to stop processing more resources to reallocate memory. Once the worker thread completes this task, the GC takes place.

After giving memory pages away, the pages are mapped to a special address, which is referred to herein as the zero space or zero memory. In one embodiment, if a zero memory is accessed by a process, the hypervisor will allocate a new page of memory for that VM using the COW method, described above.

Figure 6:
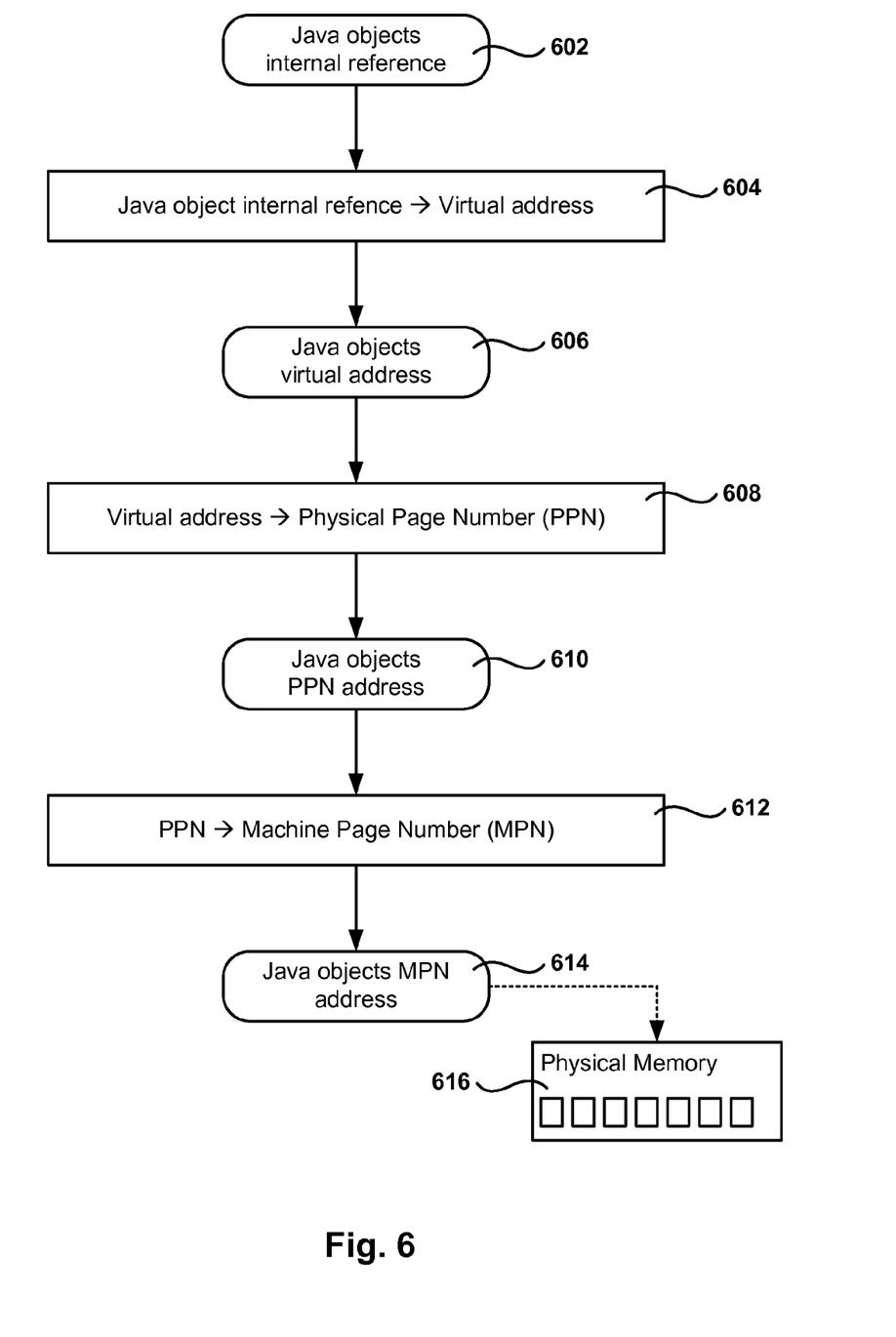
FIG. 6 illustrates an embodiment of a memory addressing scheme for implementing embodiments of the invention.

FIG. 6 illustrates an embodiment of a memory addressing scheme for implementing embodiments of the invention. FIG. 6 is a roadmap to the different addressing forms used by the different modules of FIG. 5. Initially, the Java balloon agent obtains a Java object 602. The Java object is translated 604 to a virtual address by the JNI call, resulting in virtual address 606. The guest OS translates 608 the virtual address to the corresponding PPN in the VM and results in the PPN address of the Java object 610. Finally, the VMKernel translates 612 the PPN to a Machine Page Number (MPN) 614. The MPN 614 is the host memory address for the Java object.

Figure 7:
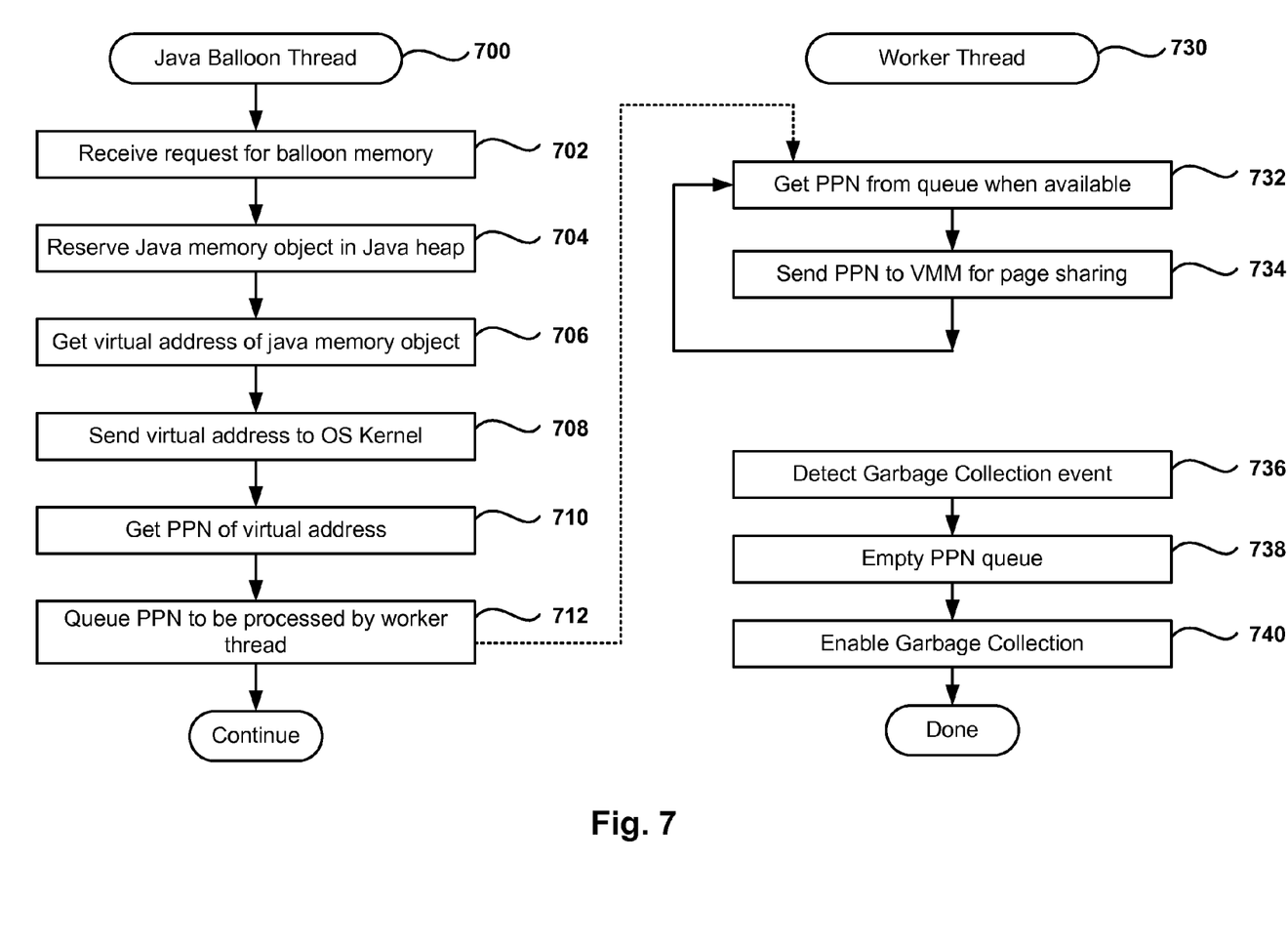
FIG. 7 shows the process flow for managing memory in a host where virtual machines execute, in accordance with one embodiment of the invention

FIG. 7 shows the process flow for managing memory in a host where virtual machines (VMs) execute, in accordance with one embodiment of the invention. The process in FIG. 7 describes the operations performed in reference to the system of FIG. 5. The process involves two threads: Java balloon thread 700 and worker thread 730. With respect to Java balloon thread 700, the method starts in operation 702 where the Java balloon agent receives a request for balloon memory. In one embodiment, the request is received by polling the OS balloon driver. In another embodiment, balloon memory reservation can be performed proactively by the Java agent, i.e., the Java agent allocates objects without receiving a request for memory. For example, the Java agent can detect a period of low activity in the VM, or a low demand for memory in the VM, and decide to reserve balloon memory. After operation 702, the method flows to operation 704 where the Java balloon reserves a memory object in the Java heap, and then to operation 706 where the virtual address of the Java object is obtained.

In operation 708, the virtual address is sent to the guest OS kernel, and in operation 710, the guest OS kernel gets the PPN corresponding to the virtual address obtained in operation 708. After operation 708, the method continues in operation 712 where the PPN is queued, ready to be processed by worker thread 730.

Worker thread 730 performs two processes. In the first process, the worker thread gets a PPN from the queue of candidate PPNs in operation 732 and then sends the PPN to the VMM for page sharing the PPM. On the other process, worker thread 730 detects when a garbage collection event is to take place in operation 736. In operation 738, the worker thread empties the PPN queue and, in operation 740 garbage collection is enabled again.

A JVM heap has a static maximum limit, set when the JVM launches. If a JVM cannot find free space to allocate a new object, even after a full GC, the JVM throws an Out-of-Memory (OOM) error which typically causes an application abort. Since ballooned objects effectively reduce the heap space that can be used by applications, the ballooned memory could cause an OOM error.

To avoid OOM errors, soft references are used to balloon objects when they are added to the list. In that case, when the JVM needs space to allocate application objects, the balloon objects are freed. After each garbage collection, these references are checked to detect freed or moved balloon objects and bookkeeping is performed. Detecting freed balloon objects is a sign that the application is actively using memory. If the heap has no empty space for Java balloon objects, the VMKernel is notified via the backdoor. The VMkernel then needs to use host swap to enforce the VM's memory share.

Figure 8:
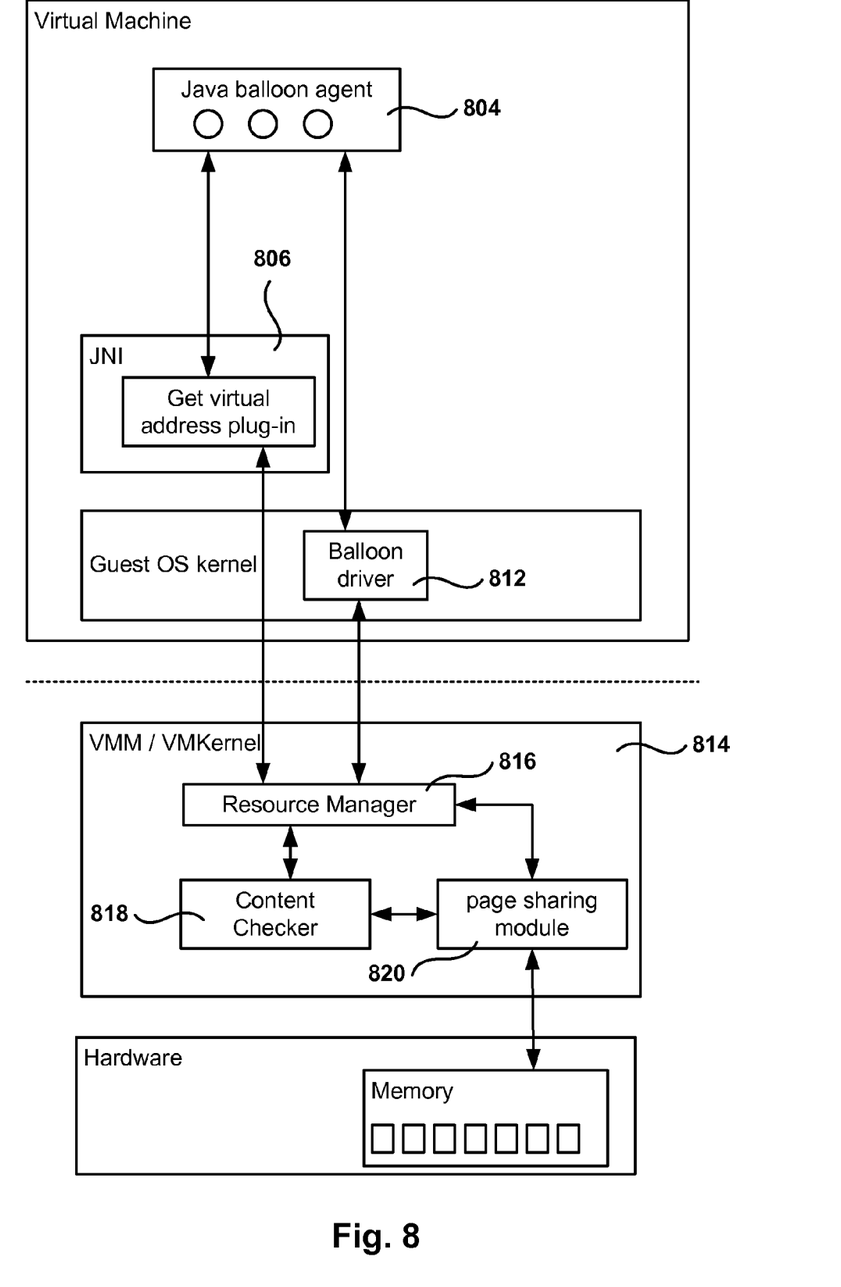
FIG. 8 is a simplified schematic diagram of a computer system for managing host memory using Java balloons, according to one embodiment.

FIG. 8 is a simplified schematic diagram of a computer system for managing host memory using Java balloons, according to one embodiment. In another embodiment for implementing a Java balloon agent 804, the balloon pages are filled with zeroes. The VMkernel's uses memory sharing of any page that is filled with zeros. This process is referred to as psharing and is performed by page sharing module 820. Content checker 818 checks memory pages for zeroes, and if it finds any zero pages, it passes them to page sharing module 820 for memory sharing. Resource manager 816 in VMKernel 814 coordinates the psharing activities by interfacing with content checker 818 and page sharing module 820. As previously discussed, Java objects may be relocated during GC. In this case, the Java agent re-visits every Java object after GC to re-share the objects the have been relocated.

This method is simple, however, it has the drawback that it is undetermined how long it will take until the pages are picked up by VMkernel 814. It is important that the Java balloon can reach the balloon target in about the same time period as the traditional balloon. In one embodiment, "hints" are passed from the Java balloon agent 804 through JNI 806 to balloon driver 812 and resource manager 816 in VMKernel 814.

Figure 9:
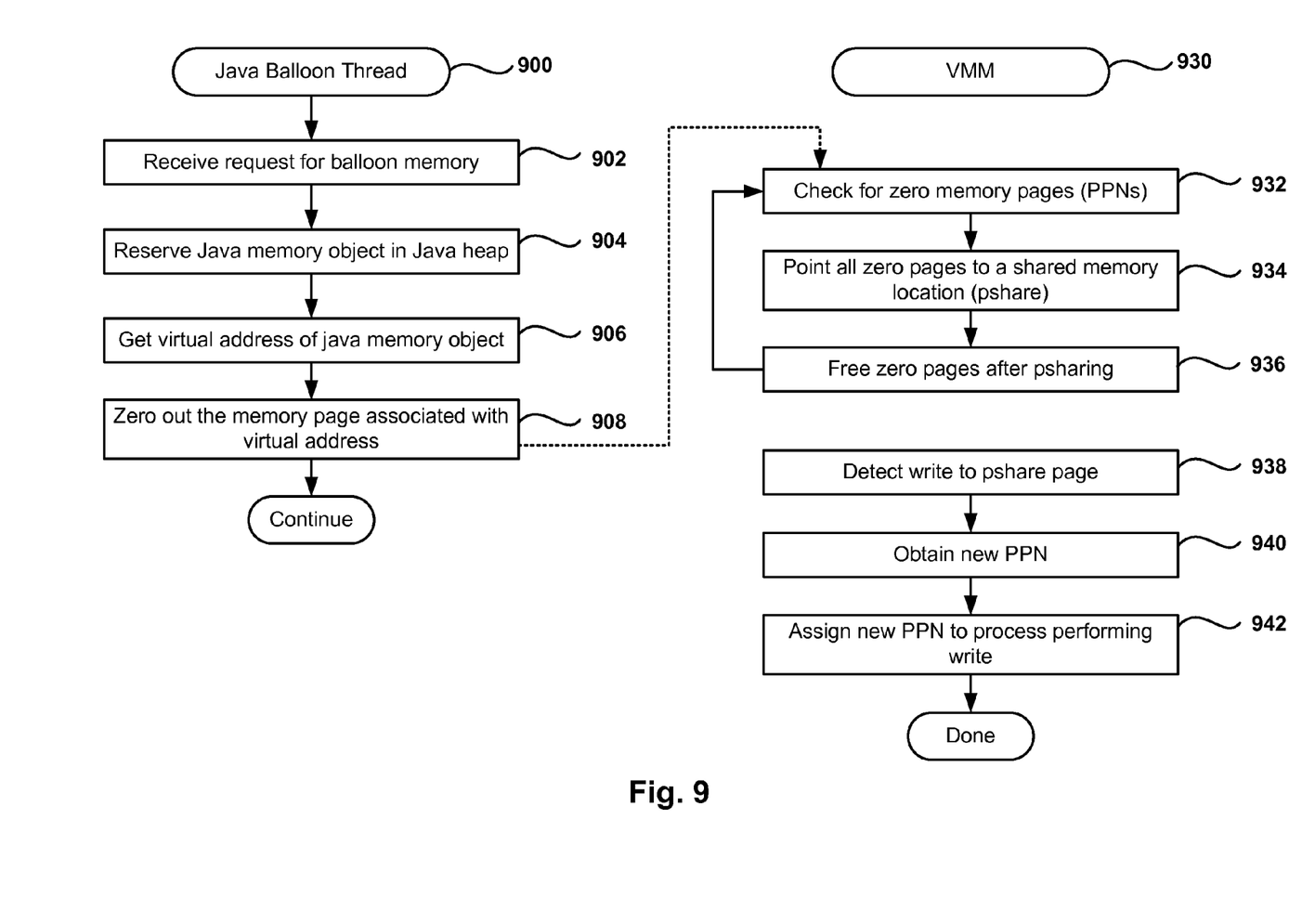
FIG. 9 shows the process flow for managing memory in a host where virtual machines execute, in accordance with one embodiment of the invention

FIG. 9 shows the process flow for managing memory in a host where virtual machines (VMs) execute, as described above in reference to FIG. 8, and in accordance with one embodiment of the invention. There are two threads in the process: Java Balloon Thread 900 and VMM thread 930. In operation 902, Java balloon thread 900 receives a request for balloon memory, and in operation 904, the Java balloon thread reserves a Java memory object in the Java heap. In one embodiment, the size of the Java object is equal to the size of a memory page. In other embodiment, the size of the Java object is equal to the size of several memory pages. After operation 904, the method continues to operation 906 where the virtual address of the memory object is obtained before zeroing out the memory page in operation 908. In another embodiment, operation 906 is not performed and the Java balloon thread zeroes out the Java object without needing to find out its address. Once the VMM detects the zero memory page, the zero memory page will be pshared. A backdoor call is performed by the Java Balloon Thread to notify the VMM.

In reference to the VMM thread, the VMM checks for zero memory pages, PPNs, in operation 932 to mark the pages as candidates for psharing. As previously described, the VMM can "blindly" search for zero pages in memory, or it can received "hints" from the VM to indicate which pages are candidates for psharing.

It should be appreciated that the use of a zero value in memory is an exemplary way of adding content to the page. In fact, any value can be used as long as the VMM knows which value is being entered by the VM. The embodiments illustrated in FIGS. 8 and 9 should therefore not be interpreted to be exclusive or limiting, but rather exemplary or illustrative.

Further, the method flows from operation 932 to operation 934 where the zero pages are mapped to a share memory location. After a page has been remapped in operation 934, the method frees the zero page in operation 936 to make it available for other host processes. The VMM also detects writes, during operation 938, to any page that has been reallocated after psharing. In operation 940, the VMM obtains a new PPN for the process trying to do a write and then assigns the newly obtained page to this process in operation 942.

Another embodiment for memory management in JVMs adds an additional backdoor call to serve as a hint to VMM for page sharing. The JNI directly calls this backdoor with a balloon object's virtual address. The VMM then walks the guest page table to find the PPNs, and calls into VMkernel so that these PPNs become COW candidates. This scheme does not require a change to the kernel driver.

Figure 10:
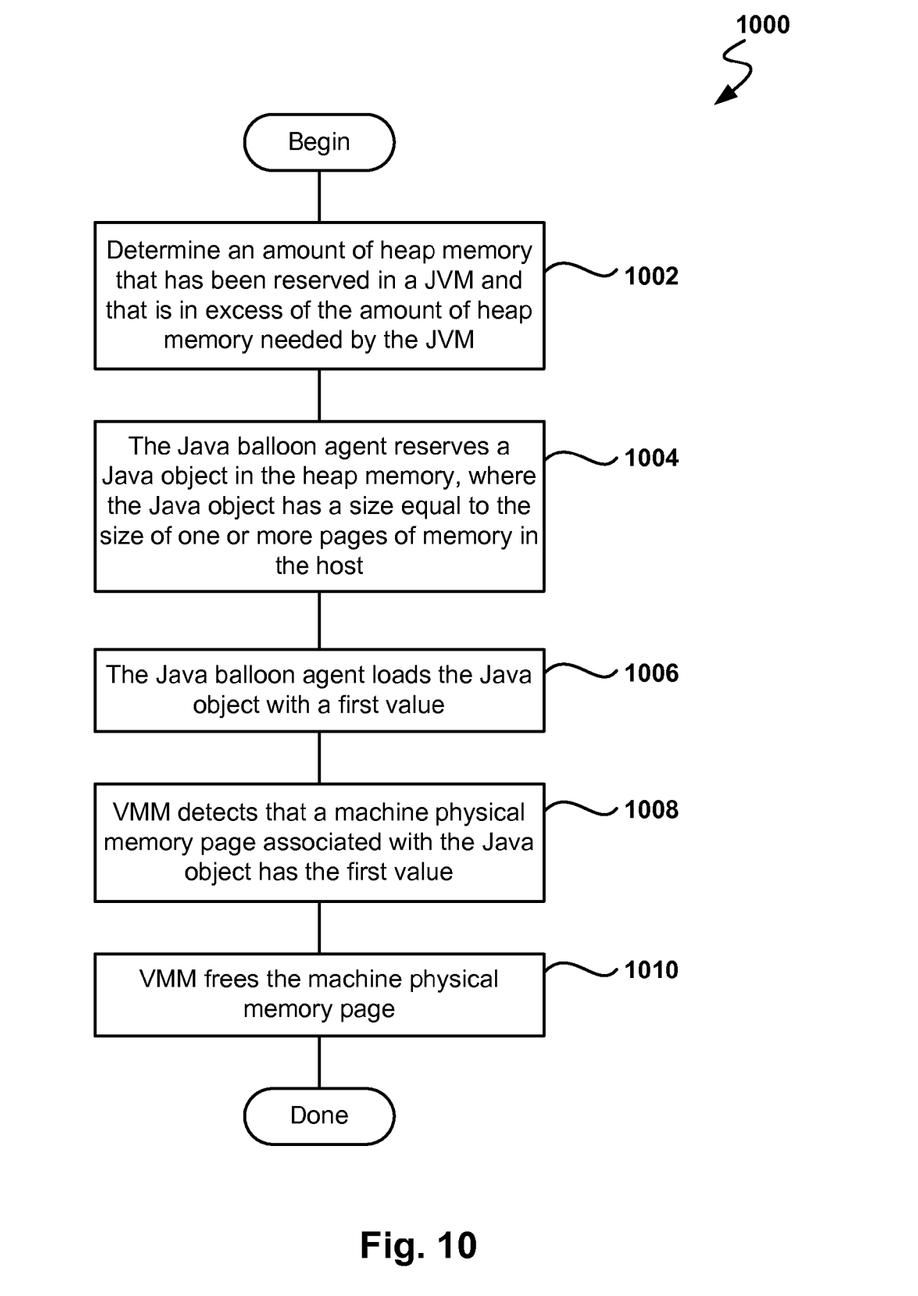
FIG. 10 shows the process flow for managing memory in a host where virtual machines execute, according to one embodiment.

FIG. 10 shows the process flow for managing memory in a host where virtual machines (VMs) execute, according to one embodiment. In operation 1002, it is determined an amount of heap memory that has been reserved in a Java virtual machine (JVM) and that is in excess of heap memory needed by the JVM. Further, in operation 1004, a Java balloon agent reserves a Java object in the heap memory. The Java object has a size equal to the size of a page of memory in the host. In another embodiment, the Java object has a size equal to the size of several memory pages.

After operation 1004, the method continues to operation 1006, there the Java balloon agent loads the Java object with a first value. In one embodiment the first value is a page of zero values, but other values are also possible. In operation 1008, the VMM detects that a machine physical memory page associated with the Java object has the first value. In operation 1010, the VMM frees the machine physical memory page detected in operation 1008.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing memory in a host having virtualization software that supports execution of a virtual machine (VM) having a guest operating system that manages allocation of guest physical memory, a balloon driver installed in the guest operating system, and a Java Virtual Machine (JVM) executing as an application on top of the guest operating system and having a heap memory allocated from the guest physical memory, the method comprising:
   at the balloon driver, receiving a request from the virtualization software for memory pages and communicating a target number of memory pages to a Java balloon agent;
   allocating, by the Java balloon agent, a Java balloon object in the heap memory of the JVM, the Java balloon agent executing as a Java thread in the JVM, the Java balloon object being allocated a number of memory pages equal to the target number of memory pages;
   loading a first value into each of the memory pages of the Java balloon object, the loading being performed by the Java balloon agent;
   detecting by the virtualization software machine physical memory pages having the first value; and
   reclaiming the detected machine physical memory pages by the virtualization software.

2. The method as recited in claim 1, further including:
   sending from the balloon driver to the Java balloon agent a request to obtain memory before allocating the Java balloon object.

3. The method as recited in claim 1, wherein reclaiming the detected machine physical memory pages further includes:
   changing an association of a physical page of memory in the VM to a machine physical memory page in order to associate the physical page of memory with a common machine physical memory page; and releasing the machine physical memory page after changing the association.

4. The method as recited in claim 3, further including:
performing a copy-on-write of a machine physical memory page that was reclaimed when the virtualization software detects a write to the machine physical memory page.

5. The method as recited in claim 1, further including:
continue allocating Java balloon objects and reclaiming the detected machine physical memory pages until a total amount of reclaimed machine physical memory pages reaches a threshold.

6. The method as recited in claim 1, wherein the first value is a page of memory where each element is a 0.

7. The method as recited in claim 1, further including:
detecting that an amount of free heap memory is low; and
releasing the Java balloon object that was allocated by the Java balloon agent.

8. The method as recited in claim 1, further comprising:
obtaining, by the Java balloon agent, a virtual address of the Java balloon object; and
identifying, by the virtualization software, a physical page number corresponding to the virtual address;
wherein the virtualization software detects that the machine physical memory pages associated with the Java balloon object have the first value using the physical page number.

9. A method for managing memory in a host having virtualization software that supports execution of a virtual machine (VM), having a guest operating system that manages allocation of guest physical memory, a balloon driver installed in the guest operating system, and a Java Virtual Machine (JVM) executing as an application on top of the guest operating system and having a heap memory allocated from the guest physical memory, the method comprising:
at the balloon driver, receiving a request from the virtualization software for memory pages and communicating a target number of memory pages to a Java balloon agent;
allocating, by the Java balloon agent, a Java balloon object in the heap memory of the JVM, the Java balloon agent executing as a Java thread in the JVM, the Java balloon object being allocated a number of memory pages equal to the target number of memory pages;
obtaining, by the Java balloon agent, a virtual address of the Java object;
identifying a physical page number corresponding to the virtual address;
sending the physical page number to the virtualization software; and
reclaiming a machine physical memory page associated with the physical page number by the virtualization software.

10. The method as recited in claim 9, wherein identifying the physical page number is performed by the balloon driver, wherein the balloon driver places the physical page number in a queue.

11. The method as recited in claim 10, wherein sending the physical page number further includes:
taking a queued physical page number from the queue by a worker thread; and
giving information about the queued physical page number to the the virtualization software.

12. The method as recited in claim 11, further including:
blocking garbage collection.

13. The method as recited in claim 12, further including:
detecting a garbage collection event for the heap;
notifying the worker thread of the garbage collection event;
deleting all entries from the queue; and
enabling garbage collection after deleting all the entries from the queue.

14. The method as recited in claim 9, further including:
enabling a backdoor call for user applications to pass virtual addresses to the virtualization software for page sharing.

15. The method as recited in claim 9, wherein obtaining the virtual address of the Java object further includes:
invoking an agent in a Java native interface (JNI) library.

16. The method as recited in claim 9, further including:
pinning the physical page number in memory.

17. The method as recited in claim 9, further including:
checking Java balloon objects after garbage collection (GC) to determine if the Java balloon objects have been moved; and
re-sharing with the virtualization software Java balloon objects that have been moved.

18. A system for managing memory in a host that supports execution of virtual machines (VMs), the system comprising:
one or more VMs, at least one of the VMs including,
a guest operating system that manages allocation of guest physical memory;
a balloon driver installed in the guest operating system that receives a request from the virtualization software for memory pages and communicates a target number of memory pages to a Java balloon agent;
a Java virtual machine (JVM) executing as an application on top of the guest operating system and having a heap memory allocated from the guest physical memory, and
a Java balloon agent executing as a Java thread in the JVM, wherein the Java balloon agent receives a target number of memory pages from the balloon driver and allocates a Java balloon object in the heap memory of the JVM, the Java balloon object being allocated a number of memory pages equal to the target number of memory pages, the Java balloon agent loading the Java balloon object with a first value; and
virtualization software to reclaim machine physical memory pages associated with the Java ballon object when the machine physical memory pages have the first value.

19. The system of claim 18,
wherein the balloon driver exchanges information with the Java balloon agent to free memory.

20. The system of claim 18, wherein the first value is a page of memory where each element is a 0.

21. The system of claim 18, wherein the Java balloon agent is configured to obtain a virtual address of the Java balloon object, wherein the virtualization software is configured to identify a physical page number corresponding to the virtual address and use the physical page number to detect that the machine physical memory pages associated with the Java balloon object have the first value.

22. A non-transitory computer readable storage medium comprising instructions that, when executed, cause a machine to at least:
manage memory in a host having virtualization software that supports execution of a virtual machine (VM) having guest operating system that manages allocation of guest physical memory, a balloon driver installed in the guest operating system, a Java virtual machine (JVM) executing as an application on top of the guest operating system and having a heap memory allocated from the guest physical memory, and a Java balloon agent to execute as a Java thread in the JVM;

receive at the balloon driver a request from the virtualization software for memory pages and communicate a target number of memory pages to the Java balloon agent;

allocate a Java balloon object in the heap memory of the JVM by the Java balloon agent, the Java balloon object being allocated a number of memory pages equal to a target number of memory pages;

load a first value into each of the memory pages of the Java balloon object, the loading being performed by the Java balloon agent;

detect by the virtualization software machine physical memory pages having the first value; and reclaim the detected machine physical memory pages by the virtualization software.

* * * * *